United States Patent
Verbo et al.

[19]

[11] Patent Number: 6,041,601
[45] Date of Patent: Mar. 28, 2000

[54] BRAKE DEVICE WITH CONTROLLED BRITTLE ZONE

[75] Inventors: Ulysse Verbo, Aulnay-sous-Bois; Cedric Leboisne, La Courneuve, both of France

[73] Assignee: Bosch Systemes de Freinage, Drancy, France

[21] Appl. No.: 08/981,399

[22] PCT Filed: Dec. 9, 1997

[86] PCT No.: PCT/FR97/02234

§ 371 Date: Dec. 16, 1997

§ 102(e) Date: Dec. 16, 1997

[87] PCT Pub. No.: WO98/38070

PCT Pub. Date: Sep. 3, 1998

[30] Foreign Application Priority Data

Feb. 28, 1997 [FR] France .................................. 97 02393

[51] Int. Cl.[7] .................................................. B60T 13/00
[52] U.S. Cl. ...................... 60/547.1; 91/376 R; 92/169.1
[58] Field of Search .................................. 60/547.1, 554; 91/376 R; 92/99, 169.1

[56] References Cited

U.S. PATENT DOCUMENTS 3,552,272  1/1971  Parsons .................................. 91/376 R
5,634,337  6/1997  Gautier et al. ............................ 60/554
5,797,264  8/1998  Verbo et al. ............................ 60/547.1
5,941,610  8/1999  Hayashi et al. ........................ 91/376 R

FOREIGN PATENT DOCUMENTS 685339  12/1952  United Kingdom .................. 60/547.1

*Primary Examiner*—F. Daniel Lopez
*Attorney, Agent, or Firm*—Leo H McCormick, Jr.; Warren Comstock

[57] ABSTRACT

A brake device having a master cylinder (1) connected to a pneumatic booster (2). The pneumatic booster (2) having a rigid casing (3) in which a partition (4) moves to delimit a front chamber (5) from a rear chamber (6). The casing (3) has a front shell (31) which is secured to the master cylinder (1) to form a first wall for the front chamber (5) and a rear shell (32) which forms a second wall for the rear chamber (32). In order to increase the absorption of kinetic energy in the event of an impact force being applied to the front shell (31), the front shell (31) has a peripheral member (311) secured to the rear shell (32) and a central member (312) secured to the master cylinder (1). The peripheral member (311) has a larger relative diameter (D1) than the diameter (D2) for the central member (312). The peripheral member (311) and the central member (312) are connected together in an annular overlap region (313) in a manner such that in at least the overlap region (313) the peripheral part is located in an axial direction closer to the master cylinder (1). In response to a predetermined frontal or oblique impact force being applied to the front shell (31), the connection in the overlap region (313) separates to absorb kinetic energy and prevent such impact force from being transmitted to an operator.

6 Claims, 3 Drawing Sheets

BRAKE DEVICE WITH CONTROLLED BRITTLE ZONE

The present invention relates to a braking device composed of a master cylinder and of a pneumatic booster, the booster especially comprising: a rigid casing; a moving partition delimiting at least one front chamber and one rear chamber, in a leaktight fashion, within the casing; a three-way valve which can be operated by a control rod in order selectively to allow different pressures in the front and rear chambers and correspondingly subject the moving partition to a boost force which acts in a first axial direction pointing towards the master cylinder; and a push rod connected to the moving partition for operating the master cylinder, the casing comprising a front shell secured to the master cylinder and forming a wall for the front chamber, and a rear shell forming a wall for the rear chamber.

BACKGROUND OF THE INVENTION

Devices of this type are well known in the prior art, as represented, for example, by Patent Document EP-0,664,752.

The tightening of safety standards during the last decade has revealed the need to further develop motor vehicle braking devices, and particularly boosters, in such a way that a frontal or oblique impact on the vehicle cannot readily be transmitted to the driver's leg even when the impact occurs while the driver is depressing the brake pedal as hard as he can.

Numerous solutions have been developed in an attempt to solve this problem, many of which prove highly satisfactory for a certain number of cases.

The fact still remains that the braking device for a vehicle is still installed in the engine bay of this vehicle and that the internal layout of the engine compartment of one vehicle is always practically specific to this vehicle, which means that a solution which can be employed successfully in the given vehicle may prove devoid of positive effect for some other vehicle.

SUMMARY OF THE INVENTION

The invention falls within this context and aims to provide a novel solution capable satisfactorily of limiting the transmission of a frontal or oblique impact in configurations where the known solutions do not prove effective enough.

To this end, the device of the invention is essentially characterized in that the front shell of the booster comprises a peripheral part of larger relative diameter secured to the rear shell, and a central part of smaller relative diameter secured to the master cylinder, and in that the peripheral part and the central part overlap in an annular overlap region, and in that in the overlap region the peripheral part is at least locally further forward than the central part in the first axial direction.

Thanks to this layout, the two parts of the front shell of the booster may, in the event of an impact, become detached from one another without transmitting any substantial force to the driver, the detaching of these two parts even playing a part in absorbing kinetic energy.

In one possible embodiment of the invention, the central part and the peripheral part are locally secured to each other in a non-uniform manner in the overlap region.

For example, the central part and the peripheral part may be bonded or welded together at points, the spots of adhesive or of welding being unevenly distributed around the overlap region to reveal a favoured connection region defined by a relatively high density of spots of adhesive or of welding, and a favoured breakage region defined by a relatively low density of spots of adhesive or of welding.

In an advantageous arrangement, the central part may furthermore be fitted, in the overlap region, into a fold in the peripheral part.

In the latter case, and for a booster in which the moving partition has a circular rim, the fold in the peripheral part is preferably shaped in such a way as to allow the central part in the overlap region to accommodate the rim of the moving partition.

The diameter of the central part may also be chosen to be at most equal to half the diameter of the peripheral part, to make it easier for these two parts to become detached in the event of an oblique or lateral impact.

In the latter case, the central part may furthermore have a thickness which is greater than that of the peripheral part so that it can act as a strengthener.

Further features and advantages of the invention will emerge clearly from the description thereof given hereafter by way of non-limiting indication with reference to the attached drawings.

DETAILED DESCRIPTION OF THE INVENTION

Figure 1:
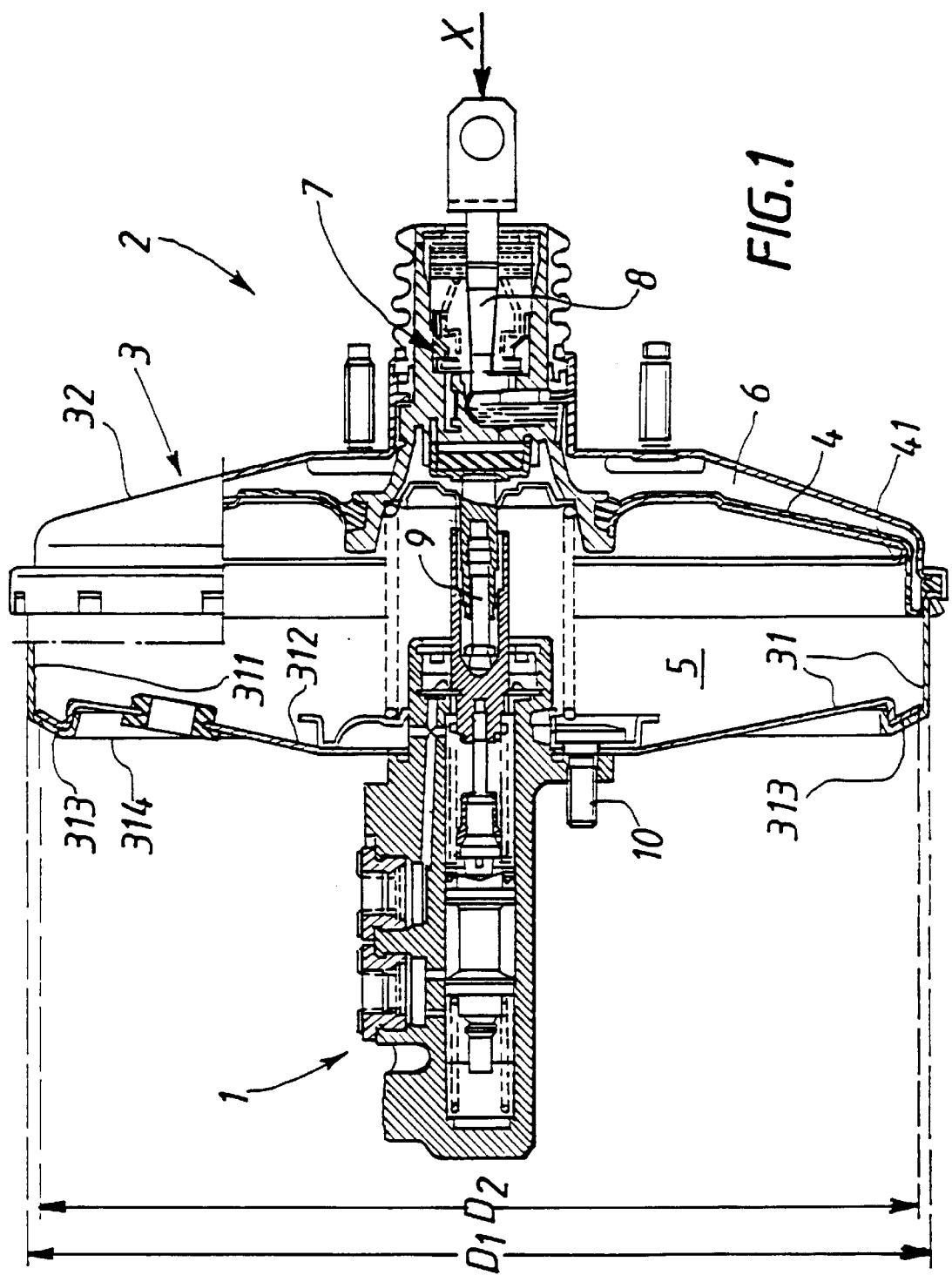
FIG. 1 is a view in part section of a braking device in accordance with the invention, illustrating a first alternative form.

As these figures show, the invention relates to a braking device composed of a master cylinder 1 and of a pneumatic booster 2.

As the way in which these devices work has been well known to those skilled in the art for a number of decades and is especially recalled in the aforementioned Patent Document EP-0,664,752, the present description will confine itself to providing details on the structure of the booster to which the invention applies.

The booster 2 especially comprises: a rigid casing 3; a moving partition 4 delimiting a front chamber 5 and a rear chamber 6, in a leaktight fashion, within the casing 3; a three-way valve 7 which can be operated by a control rod 8 in order selectively to allow different pressures into the front 5 and rear 6 chambers and correspondingly to subject the moving partition 4 to a boost force which acts in a first axial direction X pointing towards the master cylinder 1; and a push rod 9 connected to the moving partition 4 for operating the master cylinder 1.

The rigid casing 3 itself comprises a front shell 31 secured to the master cylinder 1 and forming a wall for the front chamber 5 and a rear shell 32 forming a wall for the rear chamber 6.

According to the invention, the front shell 31 comprises a peripheral part 311, of larger relative diameter D1, secured to the rear shell 32, for example by crimping, and a central part 312, of smaller relative diameter D2, secured to the master cylinder 1, for example by means of screws such as 10.

Furthermore, the peripheral part 311 and the central part 312 overlap in an annular overlap region 313 in which the peripheral part 311 is at least locally further forward than the central part 312 in the first axial direction X.

The central part and the peripheral part may, in the overlap region 313, be secured to one another by any appropriate means, such as bonding (FIGS. 1 and 3), crimping (FIG. 2), welding, clinching, etc.

However, it may be advantageous to make provision for the central part and the peripheral part to be secured together locally in a non-uniform way in the overlap region.

For example, the central part and the peripheral part may be bonded or welded together at points, the spots of adhesive or of welding being unevenly distributed in the overlap region in order to reveal a favoured connecting region, defined by a relatively high density of spots of adhesive or of welding, and a favoured breakage region defined by a relatively low density of spots of adhesive or of welding.

Figure 3:
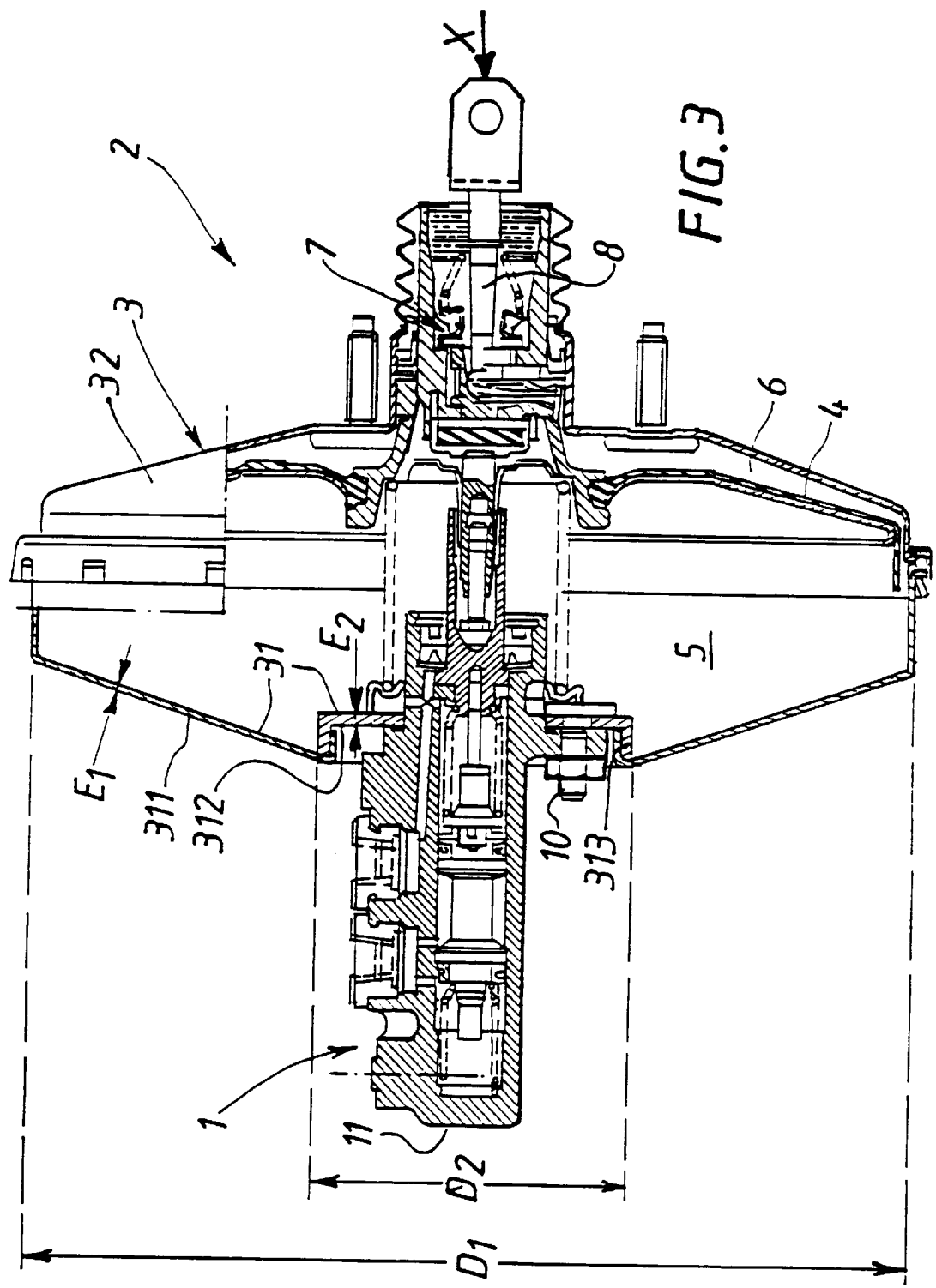
FIG. 3 is a view in part section of a braking device in accordance with the invention illustrating a third alternative form.

It is also possible to bond the central part and the peripheral part with a run of adhesive which is continuous but of variable width (FIGS. 1 and 3).

When the central part and the peripheral part are joined together at points, and the joint is therefore discontinuous, an annular seal may be placed between them, in the overlap region, to ensure that the casing 3 is leaktight.

As FIG. 1 shows, the central part 312 may furthermore be fitted, in the overlap region 313, into a fold 314 of the peripheral part 311.

In this case, if the moving partition 4 has a circular rim such as 41 it is highly advantageous to make provision for the fold 314 of the peripheral part to be shaped in such a way as to allow the central part, in the overlap region, to accommodate the rim 41 of the moving partition when this partition is at the end of its travel in the X direction, such an arrangement making it possible to optimize the length of this travel for a given axial size of booster.

Figure 2:
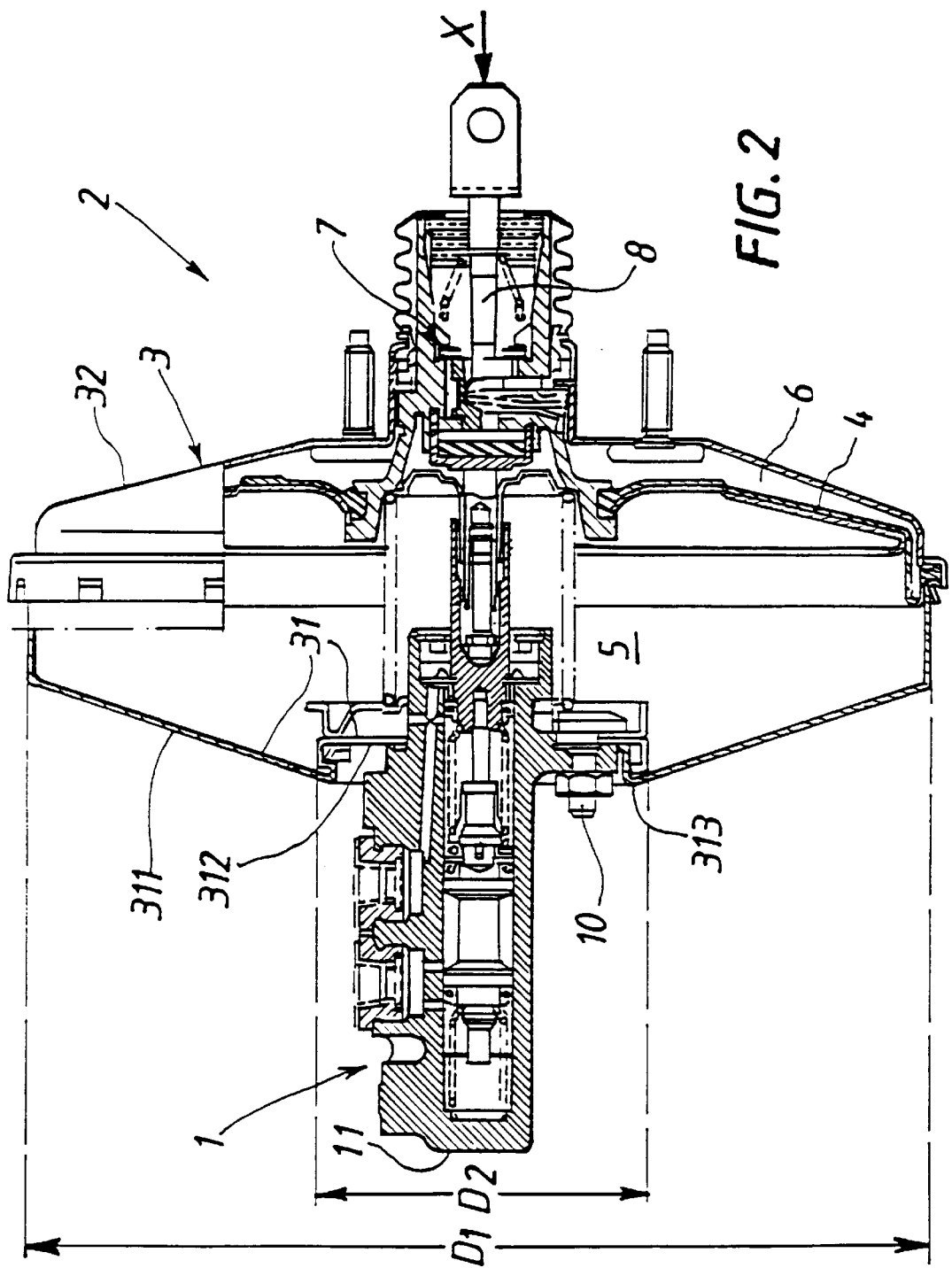
FIG. 2 is a view in part section of a braking device in accordance with the invention illustrating a second alternative form.

For maximum effectiveness of the protection against impacts, and particularly oblique impacts, it may be beneficial, as shown in FIGS. 2 and 3, to make provision for the diameter D2 of the central part to be at most equal to half the diameter D1 of the peripheral part so as to reduce the value of the torque which has to be applied at the end 11 of the master cylinder to cause the central part and the peripheral part to become detached.

In this case, it may also be advantageous, as shown in FIG. 3, to give the central part 312 a thickness E2 which is substantially greater than the thickness E1 of the peripheral part 311, it thus being possible for the central part to act as a strengthening piece, making it possible to dispense with the presence of the additional component which normally fulfils this function.

We claim:

1. A braking device having a master cylinder and of a pneumatic booster, said booster comprising: a rigid casing; a moving partition delimiting at least one front chamber and one rear chamber, in a leaktight fashion, within said casing; a three-way valve operated by a control rod to selectively to allow different pressures into said front and rear chambers to develop a correspondingly boost force which acts on said moving partition to move said moving partition in a first axial direction towards said master cylinder; and a push rod connected to said moving partition for operating said master cylinder, said casing having a front shell secured to said master cylinder and forming a first wall for said front chamber, and a rear shell forming a second wall for said rear chamber, characterized in that said front shell comprises a peripheral member having a larger relative diameter secured to said rear shell, and a central member having a smaller relative diameter secured to said master cylinder, said peripheral member and said central member being connected in an annular overlap region to form said first wall, and said overlap region of said peripheral member part is at least locally further forward than said central member part in said first axial direction, said overlap region being formed such that said first wall separates in said overlap region to absorb kinetic energy in response to a frontal or oblique impact force being applied to said first wall to prevent such impact force from being transmitted to an operator.

2. The braking device according to claim 1, characterized in that said central member and said peripheral member are locally connected to each other in a non-uniform manner in said overlap region.

3. The braking device according to claims 1, characterized in that said overlap region is defined by a fold in said peripheral member for receiving said central member.

4. The braking device according to claim 3, wherein said moving partition has a circular rim and said fold in said peripheral member is shaped in such a way as to allow said central member in said overlap region to accommodate said rim of said moving partition.

5. The braking device according to claims 1 characterized in that said central member has a diameter which is at most equal to half the diameter of said peripheral member.

6. The braking device according to claim 5, characterized in that said central member and said peripheral member have different respective first and second thickness with said first thickness being greater than said second thickness.

* * * * *